United States Patent
Greenlaw et al.

(10) Patent No.: US 9,092,748 B2
(45) Date of Patent: Jul. 28, 2015

(54) SYSTEM AND METHOD FOR CONNECTING USER ACTIONS ON A TOUCHSCREEN ELECTRONIC FLIGHT STRIP SYSTEM

(71) Applicant: Raytheon Company, Waltham, MA (US)

(72) Inventors: Colin R. Greenlaw, Marlborough, MA (US); Herbert L. Resnick, Needham, MA (US)

(73) Assignee: Raythoen Company, Waltham, MA (US)

( * ) Notice: Subject to any disclaimer, the term of this patent is extended or adjusted under 35 U.S.C. 154(b) by 0 days.

(21) Appl. No.: 14/184,814

(22) Filed: Feb. 20, 2014

(65) Prior Publication Data
US 2014/0236465 A1    Aug. 21, 2014

Related U.S. Application Data

(60) Provisional application No. 61/767,463, filed on Feb. 21, 2013.

(51) Int. Cl.
G08G 5/00    (2006.01)
G08G 5/06    (2006.01)
G06Q 10/06   (2012.01)

(52) U.S. Cl.
CPC .............. *G06Q 10/0631* (2013.01); *G08G 5/00* (2013.01); *G08G 5/0013* (2013.01); *G08G 5/0043* (2013.01); *G08G 5/0082* (2013.01)

(58) Field of Classification Search
CPC ..... G08G 5/00; G08G 5/0013; G08G 5/0043; G08G 5/0082
USPC .................. 701/4, 5, 8–10, 14–18, 120–122; 340/945, 947–983
See application file for complete search history.

(56) References Cited

U.S. PATENT DOCUMENTS

| | | | | |
|---|---|---|---|---|
| 5,659,475 | A * | 8/1997 | Brown .......................... | 701/120 |
| 5,941,929 | A * | 8/1999 | Shiomi et al. ................. | 701/120 |
| 6,246,342 | B1 * | 6/2001 | Vandevoorde et al. ....... | 340/961 |
| 6,314,363 | B1 * | 11/2001 | Pilley et al. .................. | 701/120 |
| 2003/0009278 | A1 * | 1/2003 | Mallet et al. .................. | 701/120 |
| 2005/0080551 | A1 * | 4/2005 | Ledingham et al. .......... | 701/120 |
| 2009/0118997 | A1 * | 5/2009 | Truitt ............................. | 701/120 |
| 2009/0143968 | A1 * | 6/2009 | Truitt ............................. | 701/120 |

* cited by examiner

*Primary Examiner* — Thomas Tarcza
*Assistant Examiner* — Tyler J Lee
(74) *Attorney, Agent, or Firm* — Schwegman Lundberg & Woessner, P.A.

(57) ABSTRACT

An electronic flight strip system and method of operation are disclosed. One such method receives a non-stylus touch on a touchscreen display that displays an electronic flight strip having a plurality of fields. A context-based reaction to the electronic flight strip is caused in response to which field of the plurality of fields received the non-stylus touch.

20 Claims, 10 Drawing Sheets

Table 401:

| AWE 2027 | 3551 | KBOS | KBOS HYLAND WHT | | 1555 | |
| A310/Q 364 | P1555 | ☐ | CAM 3547 SYR 359 ***KDCA [A.N.] | B22 | 22R | |
| AWE 2023 | 2004 | KBOS | KBOS HYLAND WHT | | 1668 | |
| A310/Z 506 | P1668 | ☐ | CAM 3547 SYR 359 ***KDCA [A.N.] | B12 | 22R | |
| AWE 1811 | 1234 | KBOS | KBOS HYLAND WHT | | 2240 | |
| A319/Q 143 | P2240 | ☐ | CAM 3547 SYR 359 ***KDCA [A.N.] | B2 | 22R | |
| AWE 1487 | 2364 | KBOS | KBOS HYLAND WHT | | 7895 | |
| A319/Q 807 | P7895 | ☐ | CAM 3547 SYR 359 ***KDCA [A.N.] | B5 | 22R | |
| ASQ 4123 | 5486 | KBOS | KBOS HYLAND WHT | | 5240 | |
| E145/Q 568 | P5240 | ☐ | CAM 3547 SYR 359 ***KDCA [A.N.] | B4 | 22R | |
| AWE 2027 | 5842 | KBOS | KBOS HYLAND WHT | | 4159 | |
| A310/Q 364 | P4159 | ☐ | CAM 3547 SYR 359 ***KDCA [A.N.] | B41 | 22R | |
| AWE 2027 | 2573 | KBOS | KBOS HYLAND WHT | | 9240 | |
| A310/Q 364 | P9240 | ☐ | CAM 3547 SYR 359 ***KDCA [A.N.] | B3 | 22R | |
| [121.650] | [BAY] | | [TRASH] | | [SEARCH] | |

Table 402:

| AWE 2027 | 3551 | KBOS | KBOS HYLAND WHT | | 1555 | |
| A310/Q 364 | P1555 | ☐ | CAM 3547 SYR 359 ***KDCA [A.N.] | B22 | 22R | |
| AWE 2023 | 2004 | KBOS | KBOS HYLAND WHT | | 1668 | |
| A310/Z 506 | P1668 | ☐ | CAM 3547 SYR 359 ***KDCA [A.N.] | B12 | 22R | |
| AWE 1811 | 1234 | KBOS | KBOS HYLAND WHT | | 2240 | |
| A319/Q 143 | P2240 | ☐ | CAM 3547 SYR 359 ***KDCA [A.N.] | B2 | 22R | |
| ASQ 4153 | | | | | | |
| ASQ 4123 | 5486 | KBOS | KBOS HYLAND WHT | | 5240 | |
| E145/Q 568 | P5240 | ☐ | CAM 3547 SYR 359 ***KDCA [A.N.] | B4 | 22R | |
| AWE 2027 | 5842 | KBOS | KBOS HYLAND WHT | | 4159 | |
| A310/Q 364 | P4159 | ☐ | CAM 3547 SYR 359 ***KDCA [A.N.] | B41 | 22R | |
| AWE 2027 | 2573 | KBOS | KBOS HYLAND WHT | | 9240 | |
| A310/Q 364 | P9240 | ☐ | CAM 3547 SYR 359 ***KDCA [A.N.] | B3 | 22R | |
| [121.650] | [BAY] | | [TRASH] | | [SEARCH] | |

Fig. 5

| 500 | 22R DEPARTURE QUEUE | | | | | |
|---|---|---|---|---|---|---|
| 510 | AWE 2027 | 3551 | KBOS | KBOS HYLAND WHT | | 1555 |
| | A310/Q 364 | P1555 | ⌄ | CAM 3547 SYR 359 | | |
| | | 240 | 870 | ***KDCA  A.N. | B22 | 22R |
| 511 | AWE 2023 | 2004 | KBOS | KBOS HYLAND WHT | | 1668 |
| | A310/Z 506 | P1668 | ⌄ | CAM 3547 SYR 359 | | |
| | | 240 | 852 | ***KDCA  A.N. | B12 | 22R |
| 512 | AWE 1811 | 1234 | KBOS | KBOS HYLAND WHT | | 2240 |
| | A319/Q 143 | P2240 | ⌄ | CAM 3547 SYR 359 | | |
| | | 240 | 842 | ***KDCA  A.N. | B2 | 22R |

501 LINE UP WAIT
502 LINE UP WAIT
503 LINE UP WAIT 22R
22R DEPARTURE QUEUE
22L
GO AROUND/MISSED APPROACH

504 CLEARED LAND

513 ARRIVALS

| AWE 2027 | 3551 | KBOS | | | 1555 |
|---|---|---|---|---|---|
| A310/Q 364 | P1555 | ⌄ | | | |
| | 240 | 870 | ***KDCA K.A. | B22 | 22R |

505 HANDOFF DEPARTURE   HANDOFF DEPARTURE

514

| AWE 2027 | 5842 | KBOS | KBOS HYLAND WHT | | 4159 |
|---|---|---|---|---|---|
| A310/Q 364 | P4159 | ⌄ | CAM 3547 SYR 359 | | |
| | 240 | 870 | ***KDCA  A.N. | B12 | 012 |
| AWE 2027 | 2573 | KBOS | KBOS HYLAND WHT | | 9240 |
| A310/Q 364 | P9240 | ⌄ | CAM 3547 SYR 359 | | |
| | 240 | 870 | ***KDCA  A.N. | B7 | 22R |

SYSTEM AND METHOD FOR CONNECTING USER ACTIONS ON A TOUCHSCREEN ELECTRONIC FLIGHT STRIP SYSTEM

CLAIM OF PRIORITY

This application claims the benefit of priority to U.S. Provisional Application Ser. No. 61/767,463, filed Feb. 21, 2013, which is incorporated herein by reference in its entirety.

TECHNICAL FIELD

Embodiments pertain to electronic flight strips. Some embodiments relate to user actions regarding electronic flight strips.

BACKGROUND

Today in the U.S. national airspace system (NAS), air traffic controllers make use of paper flight strips in controlling aircraft under their jurisdiction. Within an air traffic control tower, strips are physically passed between tower controllers with different roles (clearance delivery, ground control, local control) with each controller storing the strips in ordered strip bays and making markings on the strips to record interactions with pilots. Strips are also transferred between the control tower and the terminal radar room, in some cases by gravity down drop tubes, in other cases by a strip bar code scan that triggers reprinting of the strip in the radar room. This system can be inefficient and the paper flight strips can be lost, mislabeled by a controller, or inadvertently destroyed.

BRIEF DESCRIPTION OF THE DRAWINGS

FIG. 1 shows an embodiment of an electronic flight system display that includes electronic flight strips.

FIG. 4 shows an embodiment of an action for flipping an electronic flight strip.

FIG. 5 shows an embodiment of "One Touch" action buttons of an electronic flight strip.

DESCRIPTION

Figure 2:
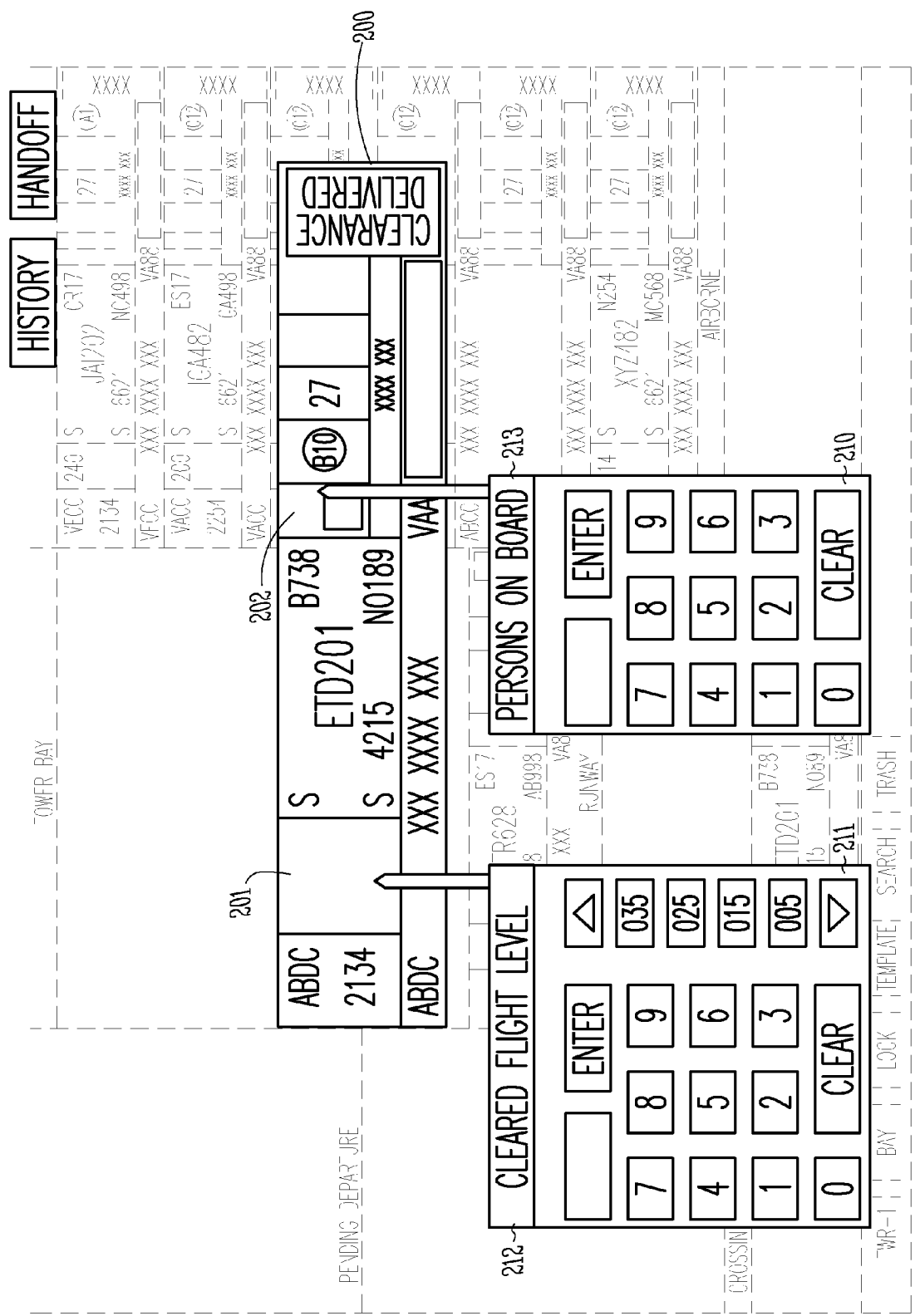
FIG. 2 shows an embodiment of an electronic flight strip in accordance with the display of FIG. 1.

The present embodiments provide an electronic flight strip (EFS) system that digitizes the paper-based, manual process making it more efficient but also retaining the flexibility that is currently afforded by a physical strip and retaining the adaptability to operational variations between different facilities. The EFS System is designed to look and behave like the current paper process employed by air traffic control (ATC) tower controllers using paper strips.

ATC facilities can include control towers, terminal radar approach control (TRACON), air route traffic control centers (Center), or flight service stations. Each facility is responsible for different phases of an aircraft's flight. Some of the facilities may share the same physical building while other facilities can be many miles from any airport. For example, a TRACON facility can be in a windowless portion of the control tower while Center can be remote from the airport.

ATC controllers can be assigned to one or more operational roles in an ATC facility. For example, a tower controller might have a clearance delivery role, a ground control role, and/or local air traffic control. Depending on the activity level of the ATC facility, some controllers can be assigned multiple roles.

Each controller can have a display position with flight strip bays that have electronic flight strips, as described subsequently. The EFS system allows the controllers to use their current workflow that exists with the current paper flight strips. For example, the electronic flight strips can be "passed" from one bay to another and one flight control position to another. For example, a clearance delivery controller can pass an electronic flight strip to any other position within the tower (e.g., ground or flight control) or to any other ATC facility (e.g., TRACON, Center).

The user interface of the EFS system uses touchscreen technology to facilitate ease of use using finger touch for all controller interactions, without the use of a stylus tool such as a pen or other tool to touch the touchscreen surface. Specific operations the controllers currently perform on the paper strips, such as flipping the strip over, adding memory jogger or blank strips, can be performed by the EFS system. Additionally, the electronic strips can display the same information as paper strips but provide the benefit of digital manipulation of the information. The digital information provides the flight data in a more clear representation (i.e., not handwritten) and enables the controller to make modifications easier while retaining the clarity of the information display. Changes to the strip and/or workflow function activation can be accomplished by touching the field to be altered. A popup, context dependent menu is displayed to enable the user to make the appropriate modification(s).

The EFS system can enable a tower controller's focus to remain out the window instead of looking inside while manipulating and/or writing paper strips. By using the touchscreen interface, an electronic flight strip can not only mimic current paper flight strip desirable behavior, but can also have additional functionality beyond the typical paper flight strip. For example, an electronic flight strip in the EFS system can mimic being flipped over and/or memory jogger strips can be provided. The formatting of the electronic flight strip can be changed to accommodate local formats currently used for paper flight strips.

Embodiments can use one or more of the following techniques to reduce the time a controller spends directly interacting with flight strips in the EFS system. The different techniques can also provide functionality that improves on the current paper flight strips. While the terms "buttons" and "keypads" are used in conjunction with the electronic flight strips and touchscreen displays, it is understood that these terms can refer to physical buttons and keypads as well as areas on a touchscreen surface that provide context-based images of buttons or keypads and, by touching the touchscreen surface, can provide the same functionality as the physical device.

One technique includes "One Touch Action" that provides a configurable workflow to reduce the number of times a controller has to interact with an electronic flight strip as compared to a paper flight strip. In such an embodiment, a context sensitive button (e.g., context-based prompt) can be placed on each strip such that, when selected, a context-based reaction occurs (e.g., progresses the flight strip through its workflow). The "One Touch Action" buttons on an electronic flight strip present the controller with one or more subsequent actions (e.g., subsequent workflow functions) based on a current state of flight data (e.g., current workflow function) and/or a phase of an aircraft's flight. The button can clearly identify an action to be performed and, when selected, moves the strip to its next function in a workflow (e.g., from clearance delivery to local air traffic controller to TRACON to Center) based on its present function in the workflow. Under usual conditions, the controller only needs to momentarily look away from directing traffic in order to select the action button. Deviations can be handled by selecting a particular electronic flight strip whereupon a list of alternate actions can be presented, if appropriate, as well as the ability to undo a previous action if it was selected in error.

A "Context Aware Data Entry" technique can reduce the typical overhead of entering flight strip changes. This embodiment can present an enlarged version of the electronic flight strip on the touchscreen and include one or more onscreen keypads for entering changes into the flight strip fields. When the controller selects a flight strip (i.e., touches it) an enlarged version is shown on the display (by having this enlarged flight strip we are not restricting the design of the regular sized flight strip which would be layout constrained given that finger touch needs large touch targets). When entering this mode the current state of the flight strip is analyzed to determine if data needs to be entered and the appropriate on screen keypads are automatically presented (saves on touches) to enter the change. Each of these keypads is optimized for the type of data to be entered. In enlarged mode the Controller also has the option to select any data field on the flight strip and if that field is editable the appropriate keypad will be presented.

The present embodiments can use a combination of touchscreen technology and a graphical user interface to provide a more efficient interaction with flight strips in an EFS System, as compared to paper flight strips. This can result an air traffic controller being able to provide safer and more efficient control of air traffic.

Figure 1:
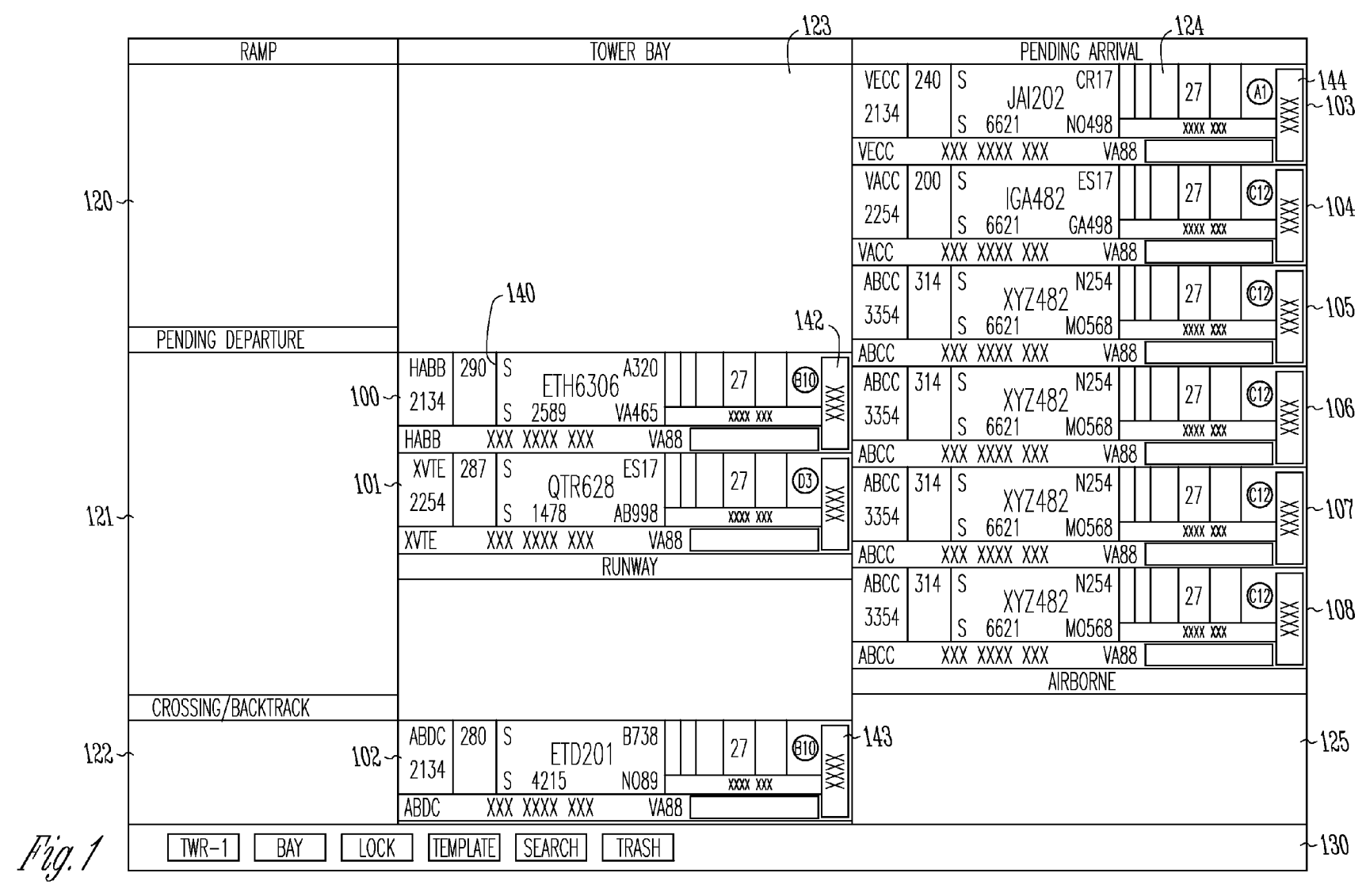

FIG. 1 illustrates an embodiment of a touchscreen display of the EFS system. Such a display could be used at each controller's station to display a plurality of electronic flight strips 100-108. Smaller versions of this display can also be used to display a more limited number of electronic flight strips 100-108.

The display can incorporate a graphical user interface to enable the controller to interact with the electronic flight strips 100-108 using the touchscreen technology. The graphical user interface can provide context-based menus and messages that are not possible with paper flight strips.

The EFS system display includes a plurality of "bays" 120-125. Each of these bays 120-125 can be associated with a different phase of an aircraft's flight and/or location on an airport. Each bay can contain one or more electronic flight strips 100-108, each electronic flight strip associated with a different aircraft.

For example, one bay 120 can be associated with aircraft that are currently parked on the ramp awaiting taxi instructions. Another bay 121 can be associated with aircraft that are waiting at a runway pending departure. Another bay 122 can be associated with aircraft that have been given instructions to cross runways or back-track on a runway or taxiway. Another bay 123 can be associated with aircraft that are being handled by local air traffic controllers (e.g., arriving aircraft, landing aircraft, or aircraft traversing airport airspace). Another bay 124 can be associated with aircraft that are pending arrival. Another bay 125 can be associated with aircraft that have just become airborne.

Each of these bays 120-125 can have a header area describing that particular bay's associated flight phase as well as a number indicating a quantity of flight strips 100-108 in that particular bay. The electronic flight strips 100-108 can be moved between the bays by a controller touching and holding a particular location 140 in a main body of the desired electronic flight strip 100 for a predetermined amount of time and then dragging the electronic flight strip 100 to the desired bay.

The EFS system display can also have an information area 130 that can include a local time and date, a Coordinated Universal Time (UTC) (e.g., Greenwich Mean Time (GMT), Zulu Time) as well as additional control buttons. This information area 130 is shown at the lower portion of the screen of FIG. 1 but can be located anywhere on the display.

The electronic flight strips 100-108 can include one touch action buttons 142-144 to initiate context-based actions by the controller touching the button area. Each one touch action button 142-144 can have a different function, that can change dynamically, based on the particular phase of flight represented by the electronic flight strip 100-108 (e.g., which bay 120-125 it is located in). For example, one button 142 can be touched by the controller when an aircraft initially contacts the tower after being handed-off by approach control while inbound on an instrument approach. Another button 143 can be touched by the controller when the aircraft has landed and it is desired to automatically cancel the instrument flight plan. Yet another button 144 can be touched by the controller when it is desired to plan a particular runway at the airport to be used by the arriving aircraft.

These one touch action buttons 142-144 can also automatically move the desired electronic flight strip 100-108 to a next stage of the strip's workflow (e.g., another controller's display, another bay on the same display).

The bays illustrated in FIG. 1 are examples of bays for a control tower facility. Other types of ATC facilities can have displays with bays for different aircraft phases. For example, a Center facility that handles only enroute aircraft would not have a need for ramp, departure, or tower bays.

FIG. 2 illustrates an embodiment of an enlarged version of an electronic flight strip 200 in accordance with FIG. 1. The display of the enlarged version of the strip 200 can be initiated by the controller touching a desired electronic flight strip 100-108 of FIG. 1 in order to enter/alter data in one or more fields of the strip. The enlarged size can facilitate entry of the data.

When the enlarged electronic flight strip 200 is displayed, data entry keypads 210-211 can be automatically displayed and linked to an associated field for data entry/altering. These keypads can be relevant to the current state of the strip 200. In another embodiment, the controller can touch a desired field 201-202 in order to bring up an associated data entry keypad 210-211.

Each data entry keypad 210-211 can include generic buttons for entering data into the fields 201-202. Each data entry keypad 210-211 can also include predefined values based on that particular associated field 201-202. For example, one field 201 might be assigned to display an altitude (e.g., flight level) to which the aircraft has been cleared. Thus, the data entry keypad 211 associated with that particular field 201 can include flight levels or flight level indications (e.g., shortened altitude representations) appropriate for that particular aircraft's direction of flight. The controller also has the option of manually entering a different altitude. Each data entry keypad 210-211 can also include a heading 212-213 that indicates the user for that particular field 201-202.

Figure 3:
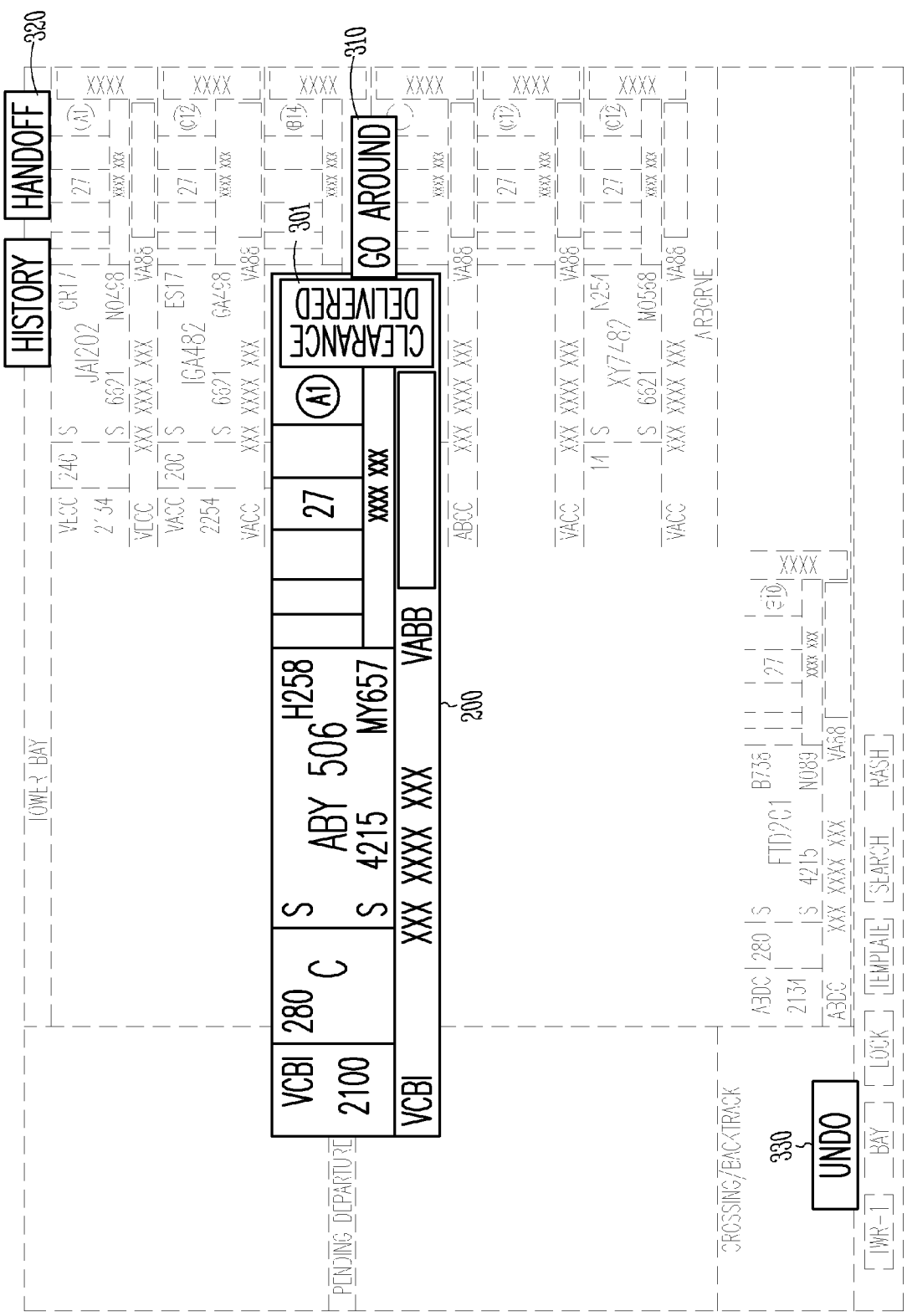
FIG. 3 shows another embodiment of the electronic flight strip in accordance with the display of FIG. 1.

FIG. 3 illustrates an embodiment of an enlarged version of the electronic flight strip 200 with various one touch action buttons 301, 310, 320, 330. The one touch action buttons 301, 310, 320, 330 can be part of the electronic flight strip 200 and/or part of the overall EFS system display. The one touch action buttons 301, 310, 320, 330 can be presented based on the data represented in the selected electronic flight strip. 200.

For example, if the aircraft is in a particular phase of flight where it is to be handed off to another controller's sector or another facility (e.g., tower-to-departure control, departure control-to-Center), then a "Handoff" button 320 can be presented on the display. A cleared to land button 301 can be implemented on the electronic flight strip 200 itself, as shown, or some other portion of the display. Similarly, a "Go Around" button 310 can be presented on the display or on the electronic flight strip 200. An "Undo" button 330 can be presented to enable the controller to undo a previously issued command. The one touch action buttons 301, 310, 320, 330 can represent a predetermined percentage (e.g., 90%) of possible deviations. The one touch action workflow can be configurable based on the ATC facility.

FIG. 4 illustrates an embodiment of an action for flipping an electronic flight strip. Controllers typically flip paper flight strips in order to indicate the flight is in a special condition such as de-icing. The electronic flight strips in the EFS system can be flipped for the same or additional purposes in order to expose "the back" of the electronic flight strip.

The controller can touch and hold a finger on the selected flight strip 401 for a configurable period of time. This causes the selected strip 401 to turn over to reveal "the back" of the flight strip 402. The aircraft call sign is automatically shown on "the back" of the flipped flight strip 402.

FIG. 5 illustrates an embodiment of "One Touch" (e.g., "Quick Action") buttons as used on electronic flight strips. These buttons can present a next action in the workflow to the controller based on the current status of the aircraft. The displayed action can be initiated by the controller touching the display at the location that the button is presented. By initiating that particular action, the selected flight strip can be automatically forwarded to the next controller and/or ATC facility in the workflow.

The embodiment of FIG. 5 illustrates an example of three aircraft located at the end of a runway in a queue for departure. The "Departure Queue" bay 500 on the display holds the electronic flight strips 510-512 that represent these aircraft. Each of these electronic flight strips 510-512 include a "One Touch" action button 501-503 that represents the next step in the workflow for that particular aircraft based on its present status. These "One Touch" action buttons are labeled as "Line Up Wait" since the controller can typically clear a selected aircraft to take the runway and wait for take-off clearance. Initiating this action can move the selected electronic flight strip to another bay but would probably keep the electronic flight strip with the same tower controller.

The buttons 501-502 can also include the label "Take-Off Clearance" to indicate that the aircraft has been immediately cleared for take-off. Other embodiments might include both of these buttons.

FIG. 5 illustrates that an arriving aircraft is represented by an electronic flight strip 513 that includes the "One Touch" button 504 labeled "Cleared Land" since that is that particular aircraft's next logical step in the workflow. Similarly, aircraft that have already departed but that have not been handed off to departure control (i.e., TRACON facility different than tower facility), such as represented by flight strip 514, can include the "One Touch" button 505 labeled "Handoff Departure" to enable the tower controller to move the selected flight strip 514 to a departure controller (e.g., TRACON).

Figure 6:
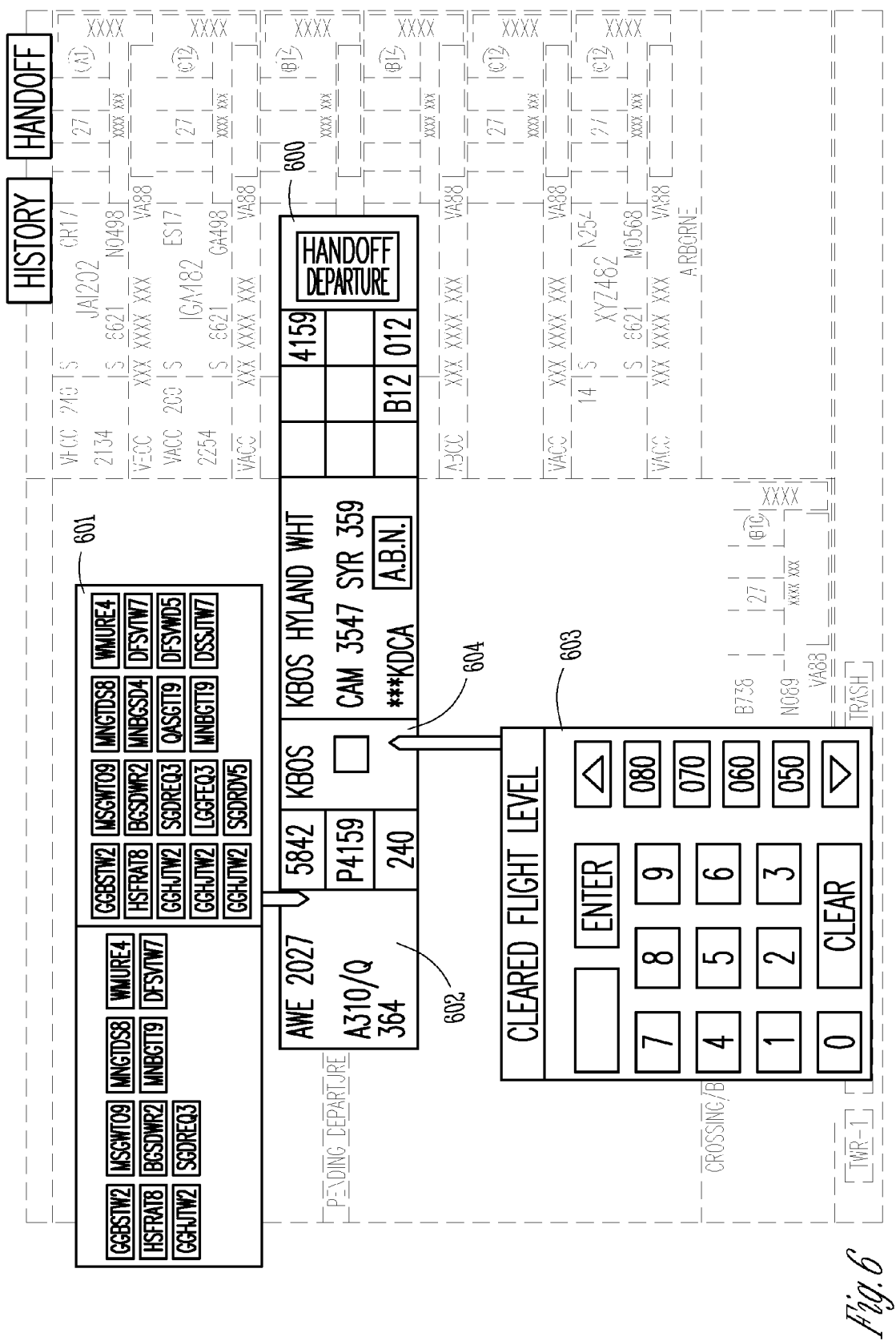
FIG. 6 shows an embodiment of a magnified electronic flight strip having context-based menus.

FIG. 6 illustrates an embodiment of a magnified electronic flight strip 600 having context-based menus 601, 603. When a controller selects a flight strip by touching an area of the flight strip or touching and holding an area, the selected flight strip 600 is enlarged on the display as compared to its original size. This action can also automatically display one or more different menus associated with various fields of the flight strip 600. Each menu 601, 603 can be displayed with different options for the associated field.

For example, the electronic flight strip 600 of FIG. 6 might be displayed on a clearance delivery controller display. When the controller selects the electronic flight strip 600 by touching it, the two context-based menus 601, 603 would automatically appear and have an arrow or line indicating to which field 602, 604 of the electronic flight strip that particular menu is associated.

The user selectable items in each menu 601, 603 would be different for each menu 601, 603. For example, the first field 602 of the electronic flight strip 600 can display the type of aircraft, on-board equipment, and aircraft call sign. Thus, the menu 601 associated with this field would only have data that would be appropriate for this field. Similarly, the third field over 604 can include the destination airport identifier and the final cruising altitude requested by the aircraft pilot. Thus, the menu 603 for this field would have data that would be appropriate for this field.

Figure 7:
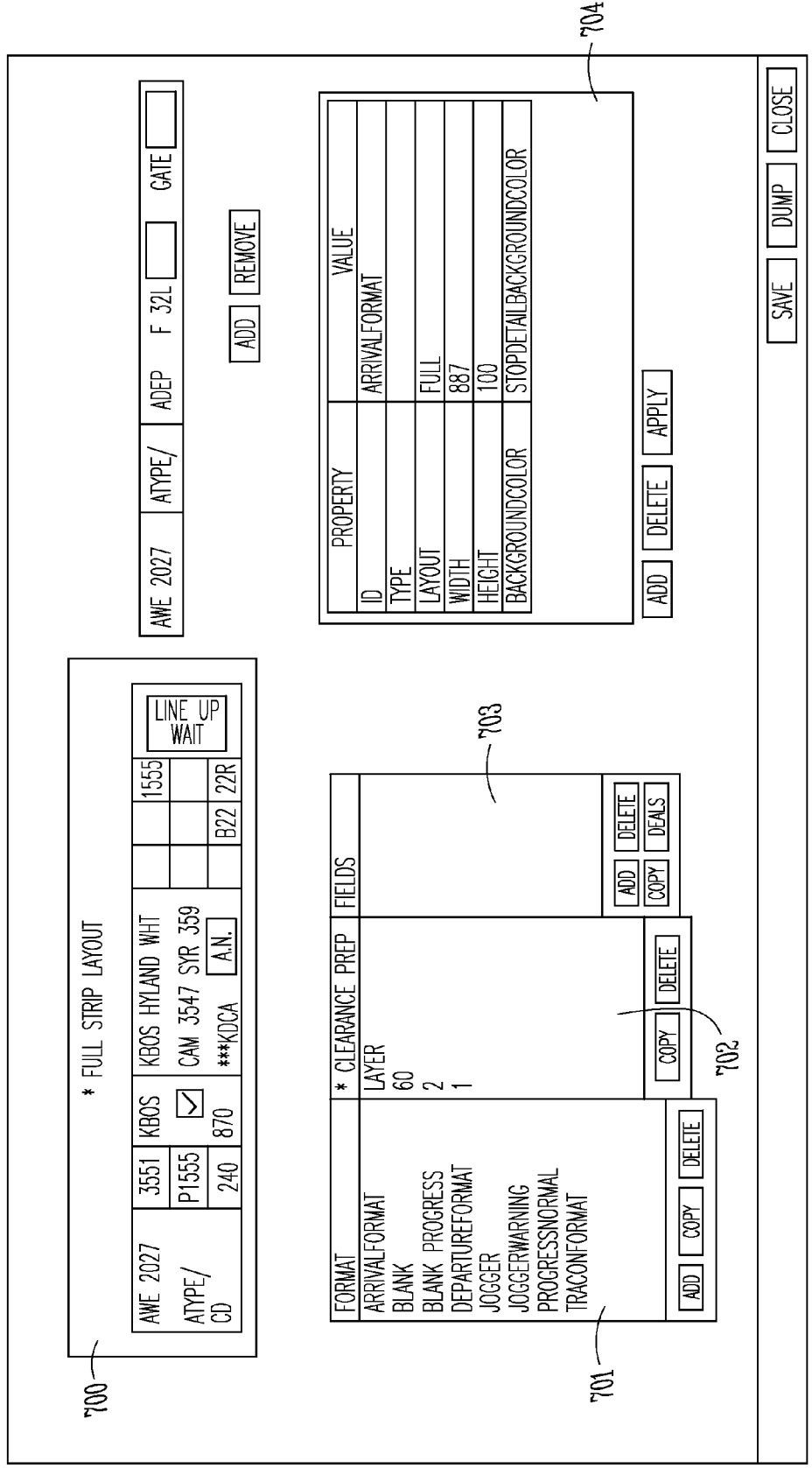
FIG. 7 shows an embodiment of an electronic flight strip having customizable fields.

FIG. 7 illustrates an embodiment of an electronic flight strip having customizable fields. Different ATC facilities might have different uses for the electronic flight strips so that different fields might be needed. A controller or a supervisor might have access to the embodiment of FIG. 7 in order to customize the fields of the electronic flight strip.

For example, various menus 701-704 can be used to enter the data to be assigned to a particular field. The resulting electronic flight strip 700 can be displayed as a work in progress until the controller hits the "SAVE" button. The new electronic flight strip can then be used within that facility.

Figure 8A:
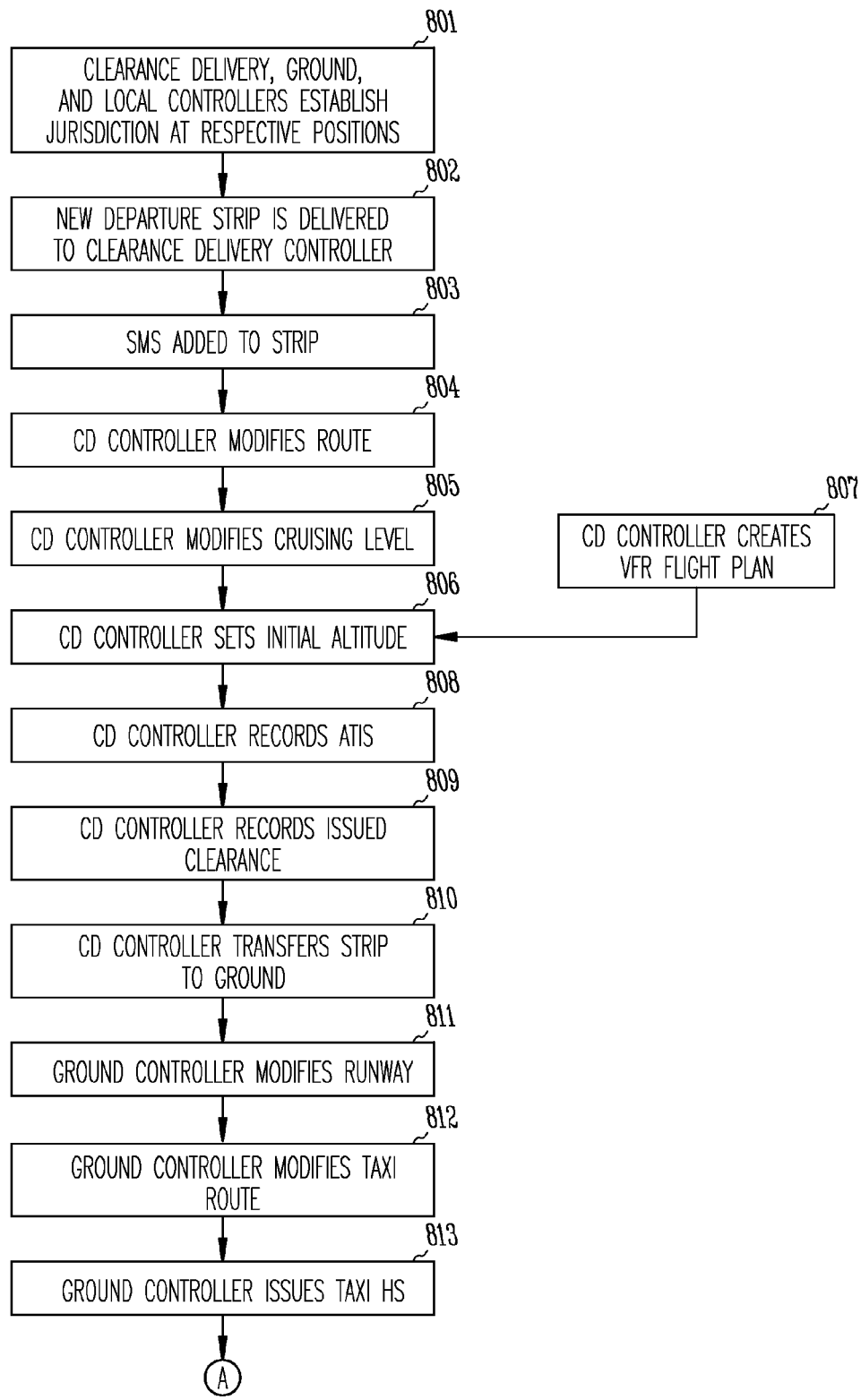
FIGS. 8A and 8B show a flowchart of an embodiment of a workflow for an electronic flight strip.
Figure 8B:
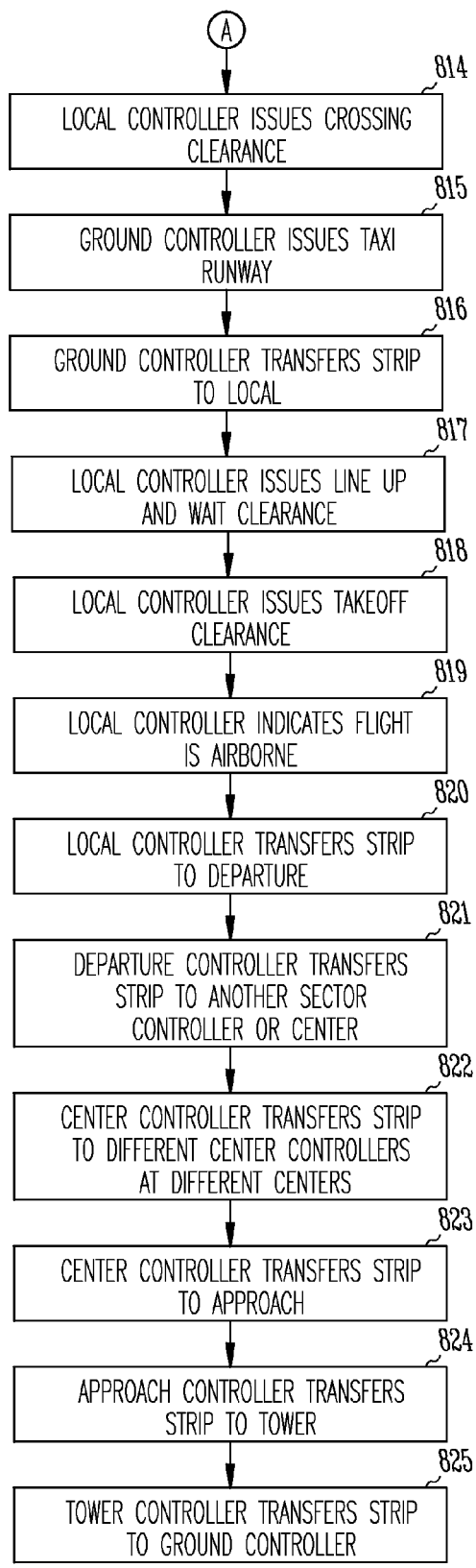

FIGS. 8A and 8B illustrate a flowchart of an embodiment of a workflow for an electronic flight strip. This workflow typically follows the progress of an aircraft's flight from receiving a clearance at a point of departure to taxiing at the destination airport. This workflow is for purposes of illustration only as other workflows could be used with the EFS system.

The clearance delivery, ground, and local tower controllers can establish their jurisdiction 801 with in the ATC tower facility (e.g., tower cab). The flight data associated with a particular flight can be generated by flight service specialist or an airline specialist and transmitted to an ATC computer. The ATC computer can then generate the electronic flight strip for display on the clearance delivery controller's display 802.

Surface management system data can be added to the electronic flight strip 803 by a ground controller. The clearance deliver controller can modify the route data 804 and the requested cruising altitude 805 on the electronic flight strip 804 based on current air traffic traveling in that direction and Federal Aviation Administration (FAA) rules. The clearance delivery controller can also set an initial cruising altitude for the aircraft 806 based on current traffic. If the aircraft is going to be flying under visual flight rules (VFR), the clearance deliver controller can generate the electronic flight strip 807.

The controller can record the automatic terminal information system (ATIS) weather and airport information 808. The clearance deliver controller can record the clearance that was issued to the aircraft pilot 809 and transfer the electronic flight strip to the ground controller display 810 as discussed previously.

The ground controller can modify the assigned runway 811 shown on the electronic flight strip based on current traffic conditions. The ground controller can also modify the assigned taxiway 812 shown on the electronic flight strip based on a change in the runway assignment and/or traffic conditions. The ground controller can also enter taxi hold short instructions 813 on the electronic flight strip based on the airport layout of taxiways and runways. The ground controller can check with the local tower controller regarding changing the hold short instructions on the electronic flight strip 814 and can enter runway crossing instructions on the electronic flight strip. The ground controller can then issue the taxi instructions to the aircraft pilot 815. The ground controller can then transfer the electronic flight strip to the local tower controller 816.

When the local tower controller is contacted by the aircraft that is awaiting departure, the local tower controller can issue line up and wait instructions 817 to the aircraft pilot. The local tower controller can then issue a take-off clearance 818 and indicated on the flight strip that the aircraft is airborne 819. This can automatically transfer the electronic flight strip from the tower to the departure controller 820.

The departure controller can, depending on the aircraft's location in the local airspace, transfer the electronic flight strip to another sector of departure control or to a center controller 821. The center controller can transfer the electronic flight strip to different center controllers along the aircraft's route of flight 822. The center controller of the center responsible for airspace around the destination airport can transfer the electronic flight strip to the local approach controller 823. As the aircraft progresses closer to the airport environment, the approach controller can transfer the electronic flight strip to the tower controller at the destination 824 who can then transfer the electronic flight strip to the local ground controller 825.

Figure 9:
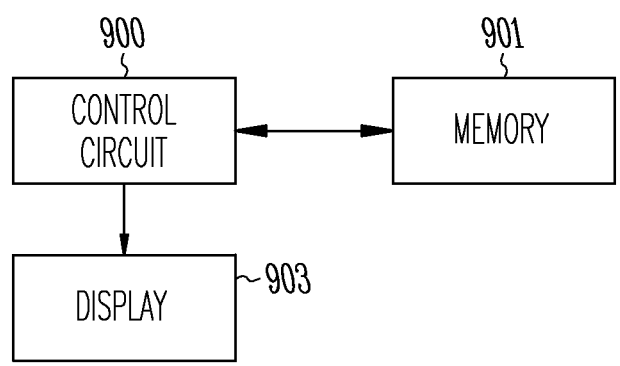
FIG. 9 shows a block diagram of an embodiment of a system in accordance with various embodiments of the EFS system.

FIG. 9 illustrates a block diagram of an embodiment of an electronic system according to various embodiments. The system can include a control circuit 900 that can execute the methods discussed previously. A memory 901 can be coupled to the controller and be configured to store the flight data, data representing the electronic flight strips, and other relevant data for any disclosed embodiment. The memory 901 can include read only memory (ROM), random access memory (RAM), non-volatile memory, disk drives, as well as other forms of memory. The display 903, coupled to the control circuit 900, can encompass one or more displays such as the EFS system touchscreen displays of the previous embodiments.

Embodiments may be implemented in one or a combination of hardware, firmware and software. Embodiments may also be implemented as instructions stored on a computer-readable storage device, which may be read and executed by at least one control circuit to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the system may include one or more processors and may be configured with instructions stored on a computer-readable storage device.

The Abstract is provided to allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An electronic flight strip system comprising:
    a control circuit, coupled to a touchscreen display, to display an electronic flight strip on the touchscreen display, interpret a single touch input on a current workflow function of the displayed electronic flight strip, and activate, in response to the single touch input, a subsequent workflow function based on a current phase of an aircraft flight represented by the electronic flight strip, wherein the current workflow function comprises a representation of a current electronic flight strip action and the subsequent workflow function comprises a representation of a subsequent flight strip action.

2. The system of claim 1 further comprising a memory, coupled to the control circuit, to store data representing the electronic flight strip.

3. The system of claim 1 wherein the controller is further to display a plurality of fields as part of the electronic flight strip, interpret the touch input on a selected one of the plurality of fields, and display a context-based menu for the selected one of the plurality of fields.

4. The system of claim 1 wherein the controller, in response to the touch input, is further to display a magnified electronic flight strip.

5. The system of claim 1 wherein the controller, in response to the touch input, is further to display a magnified electronic flight strip and a context-based menu for one or more of a plurality of fields of the electronic flight strip, wherein each context-based menu is displayed as associated with its respective field.

6. The system of claim 1 wherein the controller, in response to the touch input, is further to change the present workflow function of the electronic flight strip to a subsequent function of the electronic flight strip based on the present workflow function.

7. The system of claim 1 wherein the controller is further to generate a context-based prompt on the electronic flight strip based on its present workflow function.

8. The system of claim 1 wherein the controller is further to display a plurality of bays on the touchscreen display, wherein the electronic flight strip is moved between the bays in response to the touch input.

9. The system of claim 1 wherein the controller, in response to the touch input, is further to generate a plurality of menus to customize one or more of a plurality of fields of the electronic flight strip.

10. A method for operating an electronic flight strip system, the method comprising:
    receiving a non-stylus touch on a touchscreen display that displays an electronic flight strip having a plurality of fields; and
    causing a context-based reaction to the electronic flight strip from a current workflow function to a subsequent workflow function in response to which field of the plurality of fields receives the single non-stylus touch, the current workflow function, and a phase of an aircraft flight represented by the electronic flight strip, wherein the current workflow function comprises a representation of a current electronic flight strip action and the subsequent workflow function comprises a representation of a subsequent flight strip action.

11. The method of claim 10 wherein the context-based reaction comprises moving the electronic flight strip from a first bay, indicating a first flight status, on the touchscreen display to a second bay, indicating a second flight status, on the touchscreen display.

12. The method of claim 10 wherein the touchscreen display is a first touchscreen display and the context-based reaction comprises moving the electronic flight strip from the first touchscreen display to a second touchscreen display.

13. The method of claim 10 wherein the context-based reaction comprises enlarging the electronic flight strip on the touchscreen display from a first size to a second size that is larger than the first size.

14. The method of claim 10 wherein the context-based reaction comprises moving the electronic flight strip to a subsequent workflow function.

15. The method of claim 10 wherein the context-based reaction comprises displaying a context-based menu associated with the field that received the non-stylus touch.

16. The method of claim 10 wherein the context-based reaction comprises displaying a plurality of context-based menus, each menu associated with a particular one of the plurality of fields.

17. A non-transitory computer-readable storage medium that stores instructions for execution by control circuitry of an electronic flight system to perform manipulation of one or more electronic flight strips displayed on a touchscreen display, operations to perform the manipulation:

receive a single non-stylus touch on the touchscreen display;

determine which field of a plurality of fields of the electronic flight strip has been touched; and cause a context-based reaction to the electronic flight strip from a current workflow function to a subsequent workflow function in response to which field received the single non-stylus touch, the current workflow function, and a phase of an aircraft flight represented by the electronic flight strip, wherein the current workflow function comprises a representation of a current electronic flight strip action and the subsequent workflow function comprises a representation of a subsequent flight strip action.

18. The non-transitory computer-readable storage medium of claim 17 wherein the operations further enter context-specific data into the field that received the non-stylus touch using a displayed menu having context-specific data.

19. The non-transitory computer-readable storage medium of claim 17 wherein the operations further cause a back of the electronic flight strip to be display and aircraft specific data entered on the back of the electronic flight strip.

20. The non-transitory computer-readable storage medium of claim 17 wherein the operations further cause aircraft flight phase data to be displayed in the plurality of fields of the electronic flight strip.

* * * * *

UNITED STATES PATENT AND TRADEMARK OFFICE
CERTIFICATE OF CORRECTION

PATENT NO. : 9,092,748 B2  
APPLICATION NO. : 14/184814  
DATED : July 28, 2015  
INVENTOR(S) : Greenlaw et al.

It is certified that error appears in the above-identified patent and that said Letters Patent is hereby corrected as shown below:

In the Claims

In column 8, line 55, in Claim 10, after "a", insert --single--, therefor (First Occurrence)

Signed and Sealed this
Ninth Day of February, 2016

Michelle K. Lee
*Director of the United States Patent and Trademark Office*